(12) United States Patent
Gibbons et al.

(10) Patent No.: US 7,114,221 B2
(45) Date of Patent: Oct. 3, 2006

(54) TWO-PIECE INTERIOR TRIM RETAINER

(75) Inventors: Matthew H. Gibbons, Farmington Hills, MI (US); Roger E. Pilon, Avoca, MI (US); Lawrence J. Higgins, Sterling Heights, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/346,387

(22) Filed: Jan. 17, 2003

(65) Prior Publication Data

US 2004/0139584 A1    Jul. 22, 2004

(51) Int. Cl.
*B60R 13/02* (2006.01)

(52) U.S. Cl. .......................... 24/289; 24/295; 24/297; 24/336

(58) Field of Classification Search .......... 24/293–297, 24/336, 326, 458, 457; 296/146.7, 39.1; 52/716.7
See application file for complete search history.

(56) References Cited

U.S. PATENT DOCUMENTS

| 484,779 | A |  | 10/1892 | Cone |
| 1,845,991 | A |  | 2/1932 | Walters |
| 2,275,553 | A |  | 3/1942 | Place |
| 2,540,396 | A |  | 2/1951 | Krach |
| 2,692,414 | A |  | 10/1954 | Poupitch |
| 2,955,690 | A |  | 10/1960 | Bedford, Jr. |
| 2,983,008 | A |  | 5/1961 | VonRath |
| 3,000,066 | A |  | 9/1961 | Cochran |
| 3,006,049 | A | * | 10/1961 | Jannson ........................ 24/289 |
| 3,009,222 | A |  | 11/1961 | Gillaspie |
| 3,018,529 | A |  | 1/1962 | Perrochat |
| 3,029,486 | A |  | 4/1962 | Raymond |
| 3,034,615 | A |  | 5/1962 | Kern |
| 3,037,596 | A |  | 6/1962 | Fordyce |
| 3,040,401 | A |  | 6/1962 | VonRath |
| 3,063,114 | A |  | 11/1962 | Perrochat |
| 3,093,874 | A |  | 6/1963 | Rapata |
| 3,110,068 | A |  | 11/1963 | Perrochat |
| 3,115,225 | A |  | 12/1963 | Fraylick et al. |
| 3,213,506 | A |  | 10/1965 | Fernberg |
| 3,230,592 | A |  | 1/1966 | Hosea |
| 3,249,973 | A |  | 5/1966 | Seckerson |
| 3,309,955 | A |  | 3/1967 | Turnbull et al. |
| 3,412,437 | A |  | 11/1968 | Bennett |
| 3,478,395 | A |  | 11/1969 | Flora |
| 3,494,244 | A |  | 2/1970 | Wayland |
| 3,550,217 | A |  | 12/1970 | Collyer |
| 3,577,603 | A |  | 5/1971 | Seckerson et al. |
| 3,665,800 | A |  | 5/1972 | Ryder |
| 3,678,797 | A |  | 7/1972 | Seckerson |
| 3,695,324 | A |  | 10/1972 | Gulistan |

(Continued)

FOREIGN PATENT DOCUMENTS

DE    195 19 623 A1    12/1996

(Continued)

*Primary Examiner*—James R. Brittain
(74) *Attorney, Agent, or Firm*—Harness, Dickey & Pierce, P.L.C.

(57) ABSTRACT

A resilient clip for engaging a structure and having a body portion with a pair of top flanges, a pair of fastening members and a pair of abutting flanges. Each of the fastening members has a base portion that is coupled to an associated one of the top flanges. Each of the abutting flanges has a locking fingers which engages the mounting structure. Finger flange portions are configured to engage a first side of a mounting flange on an interior trim component.

13 Claims, 3 Drawing Sheets

U.S. PATENT DOCUMENTS

| | | | |
|---|---|---|---|
| 3,745,612 A | 7/1973 | Seckerson | |
| 3,771,275 A | 11/1973 | Seckerson | |
| 3,810,279 A | 5/1974 | Swick et al. | |
| 3,860,999 A * | 1/1975 | Meyer | 411/510 |
| 3,897,712 A | 8/1975 | Black | |
| 3,905,270 A | 9/1975 | Hehl | |
| 3,952,476 A | 4/1976 | Barnett et al. | |
| 3,988,808 A | 11/1976 | Poe et al. | |
| 4,122,583 A | 10/1978 | Grittner et al. | |
| 4,176,428 A | 12/1979 | Kimura | |
| 4,261,243 A | 4/1981 | Palmer | |
| 4,270,328 A | 6/1981 | Page et al. | |
| 4,300,865 A | 11/1981 | Murray | |
| 4,312,614 A | 1/1982 | Palmer et al. | |
| 4,318,208 A | 3/1982 | Borja et al. | |
| 4,363,160 A | 12/1982 | Wibrow | |
| D268,006 S | 2/1983 | Wollar | |
| D268,894 S | 5/1983 | Wollar | |
| 4,392,278 A | 7/1983 | Mugglestone | |
| 4,396,329 A | 8/1983 | Wollar | |
| 4,420,859 A | 12/1983 | Hammerle | |
| 4,422,276 A | 12/1983 | Paravano | |
| 4,424,612 A | 1/1984 | Muller et al. | |
| 4,427,328 A | 1/1984 | Kojima | |
| 4,431,355 A | 2/1984 | Junemann | |
| 4,470,179 A | 9/1984 | Gollin et al. | |
| 4,489,465 A | 12/1984 | Lemkin | |
| 4,499,636 A | 2/1985 | Tanaka | |
| 4,505,611 A | 3/1985 | Nagashima et al. | |
| 4,547,108 A | 10/1985 | Nakama | |
| 4,568,215 A | 2/1986 | Nelson | |
| D284,934 S | 8/1986 | Okawa | |
| 4,630,338 A | 12/1986 | Osterland et al. | |
| 4,644,612 A | 2/1987 | Osterland | |
| 4,668,145 A | 5/1987 | Hirohata | |
| 4,676,707 A | 6/1987 | Cearlock et al. | |
| D291,055 S | 7/1987 | Kukuhara et al. | |
| 4,683,622 A | 8/1987 | Oehlke | |
| 4,715,095 A | 12/1987 | Takahashi | |
| D293,882 S | 1/1988 | Takahashi | |
| D293,883 S | 1/1988 | Hirohata | |
| D293,884 S | 1/1988 | Hirohata | |
| 4,716,633 A | 1/1988 | Rizo | |
| 4,717,301 A | 1/1988 | Oddenino | |
| 4,728,238 A | 3/1988 | Chisholm et al. | |
| 4,739,543 A | 4/1988 | Harris, Jr. | |
| D297,613 S | 9/1988 | Yokoyama et al. | |
| D297,614 S | 9/1988 | Yokoyama et al. | |
| D297,615 S | 9/1988 | Nakama | |
| 4,776,739 A | 10/1988 | Hamman | |
| 4,778,320 A | 10/1988 | Nakama | |
| 4,779,313 A | 10/1988 | Gonas | |
| D298,736 S | 11/1988 | Shiraishi | |
| D298,801 S | 12/1988 | Satoh | |
| 4,810,147 A | 3/1989 | Hirohata | |
| 4,821,381 A | 4/1989 | Kaneko et al. | |
| 4,850,773 A | 7/1989 | Asami | |
| 4,861,208 A | 8/1989 | Boundy | |
| 4,865,505 A | 9/1989 | Okada | |
| 4,874,276 A | 10/1989 | Iguchi | |
| 4,890,966 A | 1/1990 | Umezawa | |
| 4,927,287 A | 5/1990 | Ohkawa et al. | |
| 4,938,645 A | 7/1990 | Wollar | |
| 4,973,212 A | 11/1990 | Jacobs | |
| 4,987,656 A | 1/1991 | Sato | |
| 5,011,356 A | 4/1991 | Fernandez | |
| 5,039,267 A | 8/1991 | Wollar | |
| 5,046,223 A | 9/1991 | Kraus | |
| 5,056,199 A | 10/1991 | Stein et al. | |
| 5,104,272 A | 4/1992 | Dupont et al. | |
| 5,106,223 A * | 4/1992 | Kraus | 403/11 |
| 5,163,730 A | 11/1992 | Welch | |
| 5,168,604 A | 12/1992 | Boville | |
| 5,173,026 A | 12/1992 | Cordola et al. | |
| 5,217,337 A | 6/1993 | Junemann et al. | |
| 5,288,530 A | 2/1994 | Maki | |
| 5,291,639 A | 3/1994 | Baum et al. | |
| 5,301,396 A | 4/1994 | Benoit | |
| 5,319,839 A | 6/1994 | Shimajiri | |
| 5,347,690 A | 9/1994 | Mansoor et al. | |
| 5,353,571 A * | 10/1994 | Berdan et al. | 52/716.5 |
| 5,373,611 A | 12/1994 | Murata | |
| D354,219 S | 1/1995 | Shimajiri | |
| D355,113 S | 2/1995 | Shimajiri | |
| 5,387,065 A | 2/1995 | Sullivan | |
| 5,393,185 A | 2/1995 | Duffy, Jr. | |
| 5,419,606 A | 5/1995 | Hull et al. | |
| 5,421,067 A | 6/1995 | Akachi et al. | |
| 5,468,108 A | 11/1995 | Sullivan et al. | |
| 5,507,610 A | 4/1996 | Benedetti et al. | |
| 5,509,182 A | 4/1996 | Nakanishi | |
| 5,517,731 A | 5/1996 | Spykerman | |
| 5,533,237 A | 7/1996 | Higgins | |
| 5,542,158 A | 8/1996 | Gronau et al. | |
| 5,568,675 A | 10/1996 | Asami et al. | |
| 5,573,362 A | 11/1996 | Asami et al. | |
| 5,580,204 A | 12/1996 | Hultman | |
| 5,592,719 A | 1/1997 | Eto et al. | |
| 5,598,609 A | 2/1997 | Asami | |
| D378,349 S | 3/1997 | Saito et al. | |
| 5,624,319 A | 4/1997 | Golczyk et al. | |
| 5,630,256 A | 5/1997 | Kanno | |
| 5,632,581 A | 5/1997 | Hasada | |
| 5,641,195 A | 6/1997 | Patel et al. | |
| 5,641,255 A | 6/1997 | Tanaka | |
| D381,258 S | 7/1997 | Saito | |
| 5,647,713 A | 7/1997 | Ge et al. | |
| 5,651,634 A | 7/1997 | Kraus | |
| D382,468 S | 8/1997 | Takahashi | |
| 5,689,863 A | 11/1997 | Sinozaki | |
| 5,694,666 A | 12/1997 | Hamamoto | |
| 5,704,753 A | 1/1998 | Ueno | |
| D390,776 S | 2/1998 | Ueno | |
| 5,716,161 A | 2/1998 | Moore et al. | |
| 5,718,549 A | 2/1998 | Noda et al. | |
| 5,758,987 A | 6/1998 | Frame et al. | |
| 5,797,714 A | 8/1998 | Oddenino | |
| 5,833,480 A | 11/1998 | Austin | |
| 5,850,676 A | 12/1998 | Takahashi et al. | |
| 5,851,097 A | 12/1998 | Shereyk et al. | |
| 5,887,319 A | 3/1999 | Smith | |
| 5,975,820 A | 11/1999 | Kirchen | |
| 5,987,714 A | 11/1999 | Smith | |
| 6,039,408 A | 3/2000 | Alvarez | |
| 6,039,523 A | 3/2000 | Kraus | |
| 6,042,296 A | 3/2000 | Wittig et al. | |
| 6,045,309 A | 4/2000 | LeVey | |
| 6,049,952 A * | 4/2000 | Mihelich et al. | 24/292 |
| 6,074,150 A | 6/2000 | Shinozaki et al. | |
| 6,101,686 A | 8/2000 | Velthoven et al. | |
| 6,196,607 B1 | 3/2001 | Gulisano | |
| 6,205,625 B1 | 3/2001 | Kato | |
| 6,209,178 B1 | 4/2001 | Wiese et al. | |
| 6,264,393 B1 | 7/2001 | Kraus | |
| 6,287,043 B1 | 9/2001 | Kraus | |
| 6,305,055 B1 | 10/2001 | Castro | |
| 6,336,768 B1 | 1/2002 | Kraus | |
| 6,364,589 B1 | 4/2002 | Wenglinski | |
| D456,699 S | 5/2002 | Nakanishi | |
| 6,398,473 B1 | 6/2002 | Kraus | |
| 6,406,236 B1 | 6/2002 | Olson, Jr. | |
| 6,431,585 B1 | 8/2002 | Rickabus et al. | |
| 6,449,814 B1 | 9/2002 | Dinsmore et al. | |
| 6,457,217 B1 | 10/2002 | Yoshii et al. | |

| | | |
|---|---|---|
| 6,474,921 B1 | 11/2002 | Gordon |
| 6,484,370 B1 * | 11/2002 | Kanie et al. .................. 24/297 |
| 6,514,024 B1 | 2/2003 | Akema et al. |
| D471,084 S | 3/2003 | Nemoto |
| 6,568,045 B1 | 5/2003 | Smith |
| 6,572,317 B1 | 6/2003 | Okada et al. |
| 6,575,681 B1 | 6/2003 | Kojima et al. |
| 6,594,870 B1 | 7/2003 | Lambrecht et al. |
| 6,612,795 B1 | 9/2003 | Kirchen |
| 6,644,886 B1 | 11/2003 | Schwarz |
| 6,681,543 B1 | 1/2004 | Nada et al. |
| 6,685,407 B1 | 2/2004 | Holzman et al. |
| 2002/0007537 A1 | 1/2002 | Lubera et al. |
| 2002/0028123 A1 | 3/2002 | Miura et al. |
| 2002/0037206 A1 | 3/2002 | Okada et al. |
| 2002/0106261 A1 | 8/2002 | Nakanishi |
| 2002/0131846 A1 | 9/2002 | Kojima et al. |
| 2003/0000048 A1 | 1/2003 | Boville |
| 2003/0093883 A1 | 5/2003 | Gibbons et al. |
| 2003/0145437 A1 | 8/2003 | Medgyes |
| 2003/0159256 A1 | 8/2003 | Clarke |
| 2004/0016088 A1 | 1/2004 | Angellotti |
| 2004/0020016 A1 | 2/2004 | Yoneoka |

FOREIGN PATENT DOCUMENTS

| | | |
|---|---|---|
| DE | 100 53 200 A1 | 5/2002 |
| EP | 0 937 898 B1 | 11/2001 |
| GB | 2 082 668 A | 3/1982 |
| GB | 2 091 801 A | 8/1982 |
| WO | WO 03/029663 A1 | 4/2003 |
| WO | WO 03/046393 A1 | 6/2003 |

* cited by examiner

TWO-PIECE INTERIOR TRIM RETAINER

TECHNICAL FIELD

The present invention relates generally to resilient clip fasteners and more particularly to a resilient clip fastener that employs a two piece geometry to secure the body portion of the resilient clip to a structure. More specifically, the present invention relates to a resilient clip fastener having a construction that utilizes a cylindrical body portion which is coupled to a metal retainer having abutment flanges to couple of an attachment flange. The invention also relates to a resilient clip fastener having a construction that accounts in several manners for part-to-part variation between the structures that are to be fastened together.

BACKGROUND OF THE INVENTION

Many current vehicles employ resilient clips to secure various components to the vehicle body. One such application concerns interior panels that mount to the interior of the vehicle such as on the doors. Such panels serve not only to provide occupants with a convenient point to grasp during ingress to and egress from the vehicle, but also provide energy absorption during a crash event.

During assembly of the vehicle, it is conventional procedure of the entire panel assembly to be installed onto the interior of the vehicle in a single operation. In other words, the panel assembly is passed through either the windshield or backlight opening of the vehicle body on the assembly line and then the panel assembly is secured by line operators to the interior of the vehicle.

In order to accomplish this assembly task, the panel assembly is typically equipped with numerous fasteners, located around the periphery of the panel assembly as well as at predetermined locations around the interior area of the panel, that are adapted to penetrate through corresponding holes located in the reinforcing sheet metal members of the vehicle interior. It is the responsibility of the line operators to properly orient the panel assembly adjacent the interior of the vehicle and press the fasteners into the various mounting holes in the reinforcing sheet metal members to secure the panel assembly to the interior of the vehicle.

For aesthetic reasons, the panel fasteners are typically secured in some fashion to the backside of the panel so that they are not visible from the interior of the vehicle after the panel assembly is installed. Consequently, it is often incumbent upon the line operators to blindly "feel" for the location of the mounting holes with their fingers before pressing the fasteners into the holes from the opposite show-surface side of the panel.

Due to slight misalignments, which can occur between the fasteners and their corresponding mounting holes, some of the fasteners may not be properly seated and secured to the sheet metal. Accordingly, there remains a need in the art for an improved fastener having a relatively low installation force and a relatively high removal force that is relatively more tolerant of misalignment problems. Ideally, the fastener should be inexpensive to manufacture, reliable and simple to install. Furthermore, the fastener should be particularly adapted for securing structures to one another in a manner, which minimizes vibration, and the concomitant noise problems that are often associated with such fasteners.

SUMMARY OF THE INVENTION

In one preferred form, the present invention provides a resilient clip for engaging a structure. The resilient clip includes a body portion having a coupling region, a metal retainer is coupled to the coupling region. The metal fastener a pair of fastening members an abutting flange. Each of the fastening members are coupled by a base portion that is coupled to an associated top flange. The abutting flange has fingers that engages the mounting structure.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
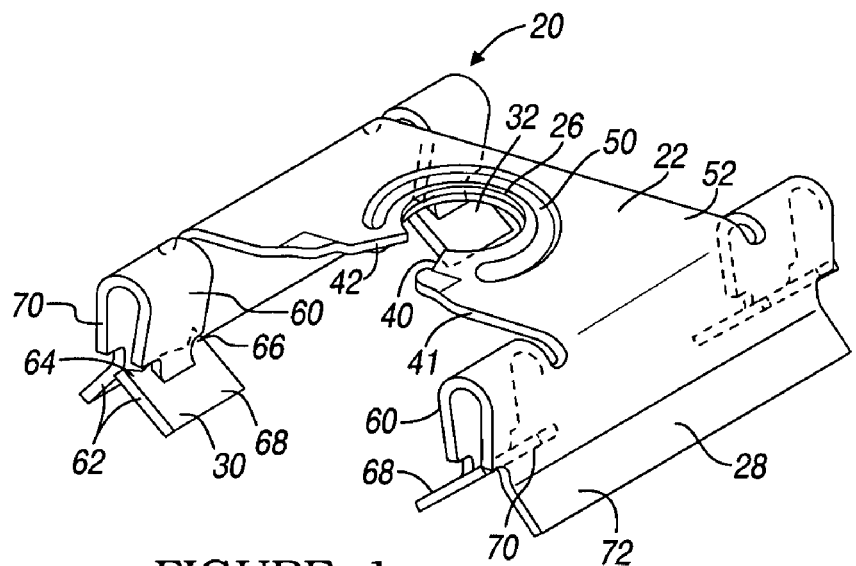
FIG. 1 represents a perspective view of a metal fastener according to the teachings of the present invention.
Figure 2:
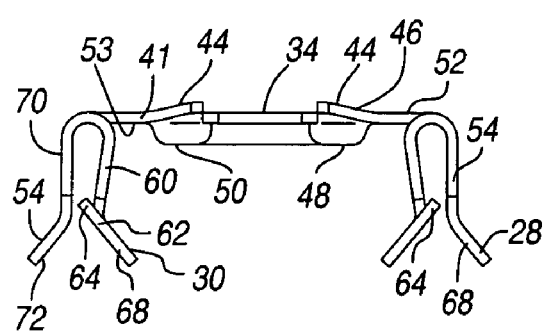
FIGS. 2–4 teach side, top and front views of the metal fastener shown in FIG. 1.
Figure 3:
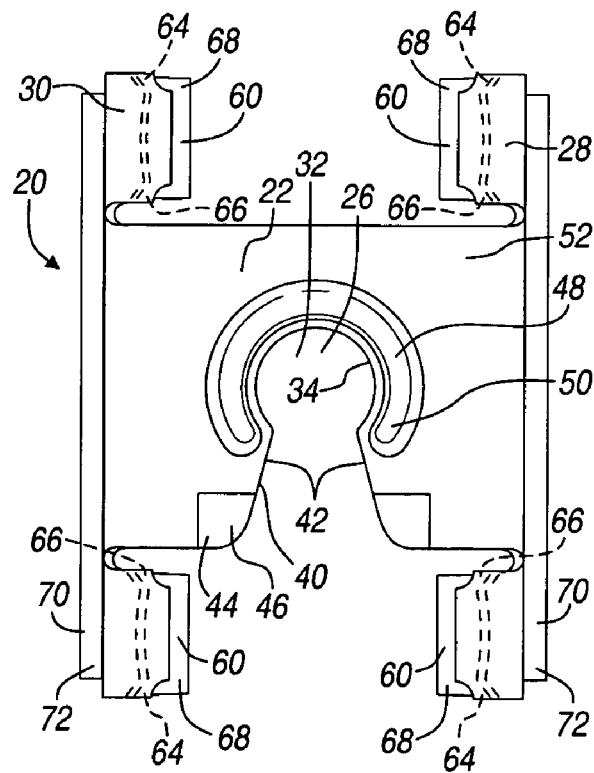
Figure 4:
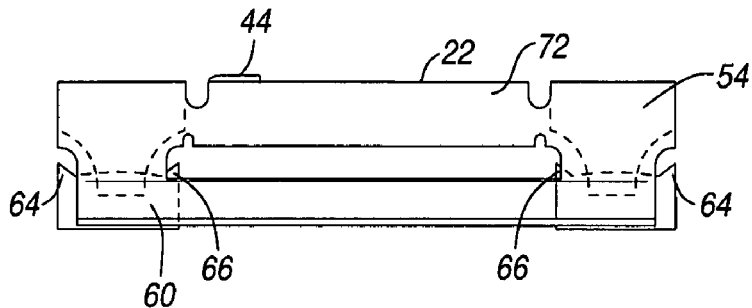

FIG. 1 represents a perspective view of the metal fastener 20 according to the teachings of the present invention. The fastener 20 has a generally planar body portion 22 which defines a coupling region 26. As described below, the coupling region 26 is configured to couple the metal fastener 22, a cylindrical fastener. The body 22 also has a pair of generally parallel coupling members 28 and 30 which are configured to couple the metal fastener 20 to a pair of generally parallel flanges (see FIG. 5).

The body portion 22 defines the coupling portion 26 as an aperture 32. The aperture 32 defines an interior coupling surface 34 which functions to support a cylindrical mating surface 36 (see FIG. 5) of a second member 38 as described below. Defined by the body portion 22 and coupled to the aperture 32 is an insertion channel 40. The insertion channel 40 is defined on a distal end 41 of the body by a pair of angled walls 42. Defined on a first portion 44 of each of the angled walls 42 is an insertion flat 46. The first portion 44 assists the insertion of the mating surface 36 of the second member 38 into the aperture 32.

Surrounding the aperture is a generally C-shaped raised portion 48. The raised portion 48 defines an upper curved surface 50. Defined between the upper curved surface 50 and the first surface 52 is a mating thickness which functions to interact with a mating groove defined on the second member 38. Alternatively, the raised portion 48 can be formed on the first surface 52, thereby defining a mating thickness between the raised portion 52 and an obverse surface 53.

Defined on the first surface 52 are four pair of clasping abutting flanges 54 which define the parallel coupling members 28 and 30. Each pair of abutting flanges 54 have a first portion 60 which defines a planar engagement surface 62. Disposed on the planar engagement surface 62 is a first pair of engaging fingers 64 and 66, which generally point to the body portion 22. The first portion 60 further has an angle insertion portion 68 which facilitates the insertion of the mounting flange (as described below). A second portion 70 of the abutting flanges is generally planar and parallel to the first portion 60. The second portion 70 functions to force the mounting flange into the engaging fingers 64 and 66. The second portion 70 further defines an insertion portion 72 which facilitates the insertion of the mounting flange. As best seen in FIG. 1, the insertion portion 72 and second portions 70 can be shared between two of the abutting flanges 54. The shared insertion portion 72 assists in the proper engagement of the mounting flange.

Figure 5:
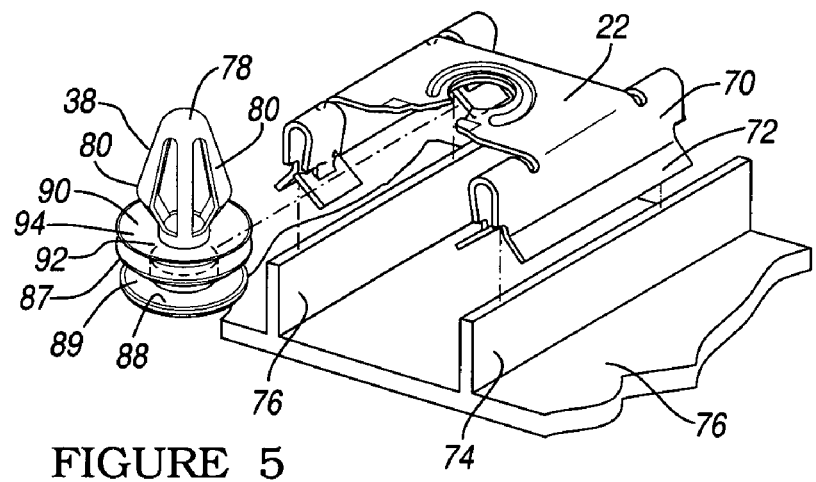
FIG. 5 shows a perspective view of the use of the metal clip according to another embodiment of the present invention.
Figure 6:
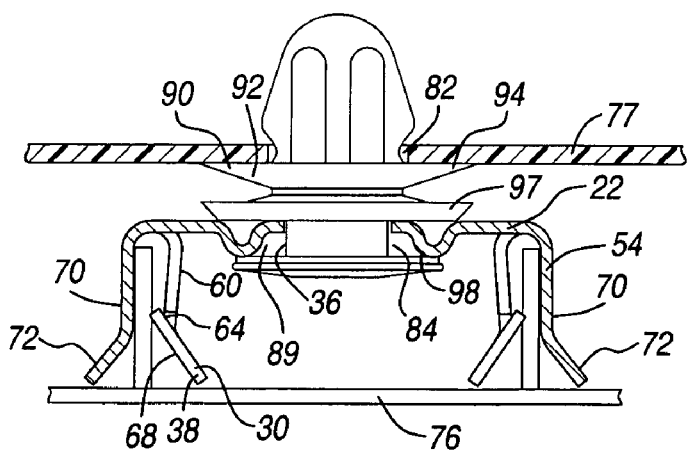
FIG. 6 is a cross-sectional view of the embodiment depicted in FIG. 5.

FIGS. 5 and 6 represent the use of the metal fastener 20 according to one embodiment of the invention. The two-piece fastener is used to couple the flange trim component 76 to a sheet metal component 77. As can be seen, the metal fastener 20 is coupled to a pair of mounting flanges 74 on the trim component 76.

The second member 38 is a polymer fastener 78 having two pair of compressible locking members 80. The locking members 80 function to couple the second member 38 to an aperture 82 formed in the sheet metal component 77.

As best seen in FIG. 6, the second member 38 defines a coupling region 84. This coupling region 84 is defined by a cylindrical mating surface 36 and a pair of generally parallel restraining surfaces 87 and 88. The restraining surfaces 87 and 88 define a coupling groove 89. Further defined on the second member 38 is an umbrella portion 90 which functions to seal the mounting aperture 82. The umbrella portion 90 is formed of a generally circular portion 92 which is surrounded by a deformable region 94.

As seen in FIG. 6, the metal fastener 20 is coupled to a pair of mating flanges 74 by the abutting coupling flanges 54. The engagement fingers 64 and 66 of the first portion 60 of the abutting coupling flanges 54 engage and plastically deform the parallel mounting flanges 74. The umbrella portion 90 is positioned so as to place the deformable region 94 in mating contact with the sheet metal component 77. The deformable region 94 is compressed so as to seal the aperture 82 formed in the sheet metal component 77.

Figure 7:
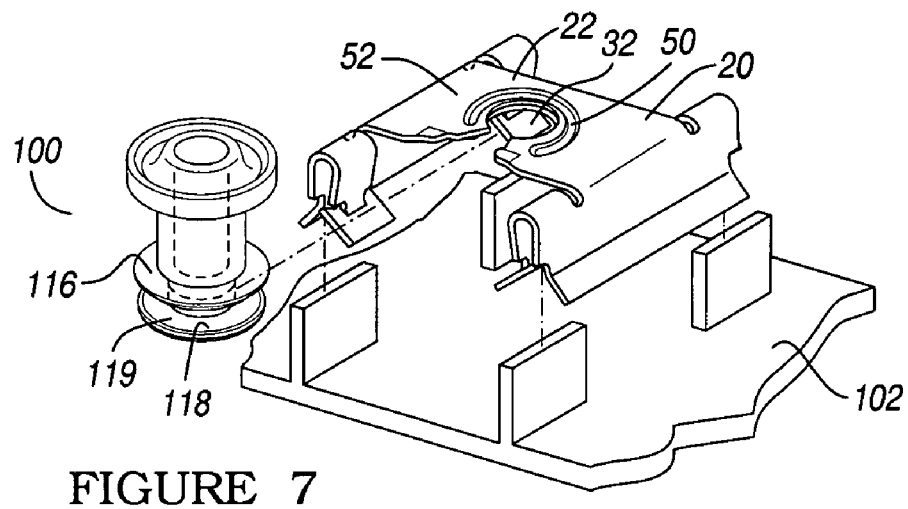
FIG. 7 is a perspective view of an alternate embodiment to the present invention.
Figure 8:
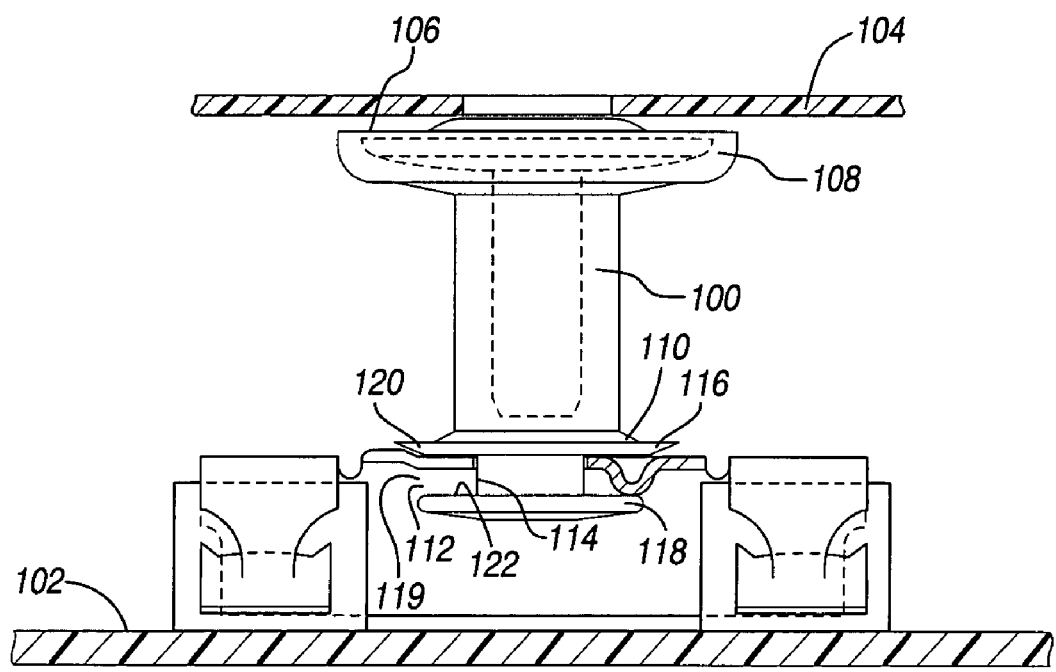
FIG. 8 is a cross-sectional view of the fastening system according to FIG. 7.

As best seen in FIGS. 7 and 8 which represent another embodiment to the present invention, the metal fastener 20 can be used with a specially configured weld stud 100 to couple the trim component 102 to a sheet metal structure 104. The weld stud 100 comprises a base weldment area 106 at its proximal end 108. Defined at a distal end 110 of the stud 100 is a coupling portion 112.

The coupling portion 112 defines a cylindrical coupling surface 114 which is configured to mate with the aperture 32 defined in the body portion 22 of the metal fastener 20. Further defined on the coupling portion 112 is a pair of generally parallel mating members 116 and 118 which define a mating groove 119. The mating members 116 and 118 define mating surfaces 120 and 122 which are spaced to conform to the space between the upper curved surface 50 of the raised portion 48 and the lower first surface 52 of the metal fastener 20.

As seen in FIGS. 6 and 8, the two-piece fastening systems are shown used to couple flanged trim components 76 and 102 to a sheet metal structure 77 and 104 at a predetermined distance from the sheet metal structures 77 and 104. The present configuration allows for a simple mechanism to assemble and disassemble trim component to sheet metal without having to form complex dog house shapes in the coupling side of the trim component. The reduction in the complexity of the molded components leads to significant reductions in the cost of forming the trim component as well as improving molding finish on the visible surface of the trim component.

The foregoing discussion discloses and describes exemplary embodiments of the present invention. One skilled in the art will readily recognize from such a discussion, and from the accompanying drawings and claims that various changes, modifications, and variations can be made therein without departing from the spirit and scope of the invention.

What is claimed is:

1. A fastening system for coupling a flanged component to a metal structure comprising:
    a first body portion having a mating portion defining at least one pair of deformable members, each of the deformable members defining a tooth configured to be mated with the metal structure, said body portion having a retaining portion, the retaining portion defining a notch; and
    a metal retainer comprising a second body portion defining an engagement aperture having angled insertion walls and a pair of generally planar engagement surfaces coupled to the retaining portion and four locking members, each of said four locking members having a pair of generally parallel locking flanges, at least one of the locking flanges having a locking protrusion, the locking protrusion configured to releasably engage the flanged component, the second body portion defining a C-shaped raised portion for engagement with the retaining portion,
    wherein the metal structure defines an aperture, the tooth of each of the deformable members configured to engage the aperture, and the first body portion comprises an umbrella member coupled to the retaining portion, the umbrella member being configured to fluidly seal the aperture.

2. The fastening system according to claim 1 wherein the deformable members are coupled to the umbrella member.

3. The fastening system according to claim 1 wherein the deformable members are coupled to a wedged-shaped portion.

4. The fastening system according to claim 1 wherein the metal retainer defines an engagement surface configured to engage the notch.

5. The fastening system according to claim 1 wherein the notch defines a cylindrical body configured to releasably engage the aperture.

6. The fastening system according to claim 1 wherein the metal retainer comprises a generally C-shaped flange configured to engage the retaining portion.

7. A fastening system for coupling a flanged component to an aperture defined in sheet metal comprising:
    a first polymer body portion comprising a locking portion defining a plurality of deformable members, each of the deformable members including a tooth configured to mate with the aperture, and the body portion including an umbrella portion, said umbrella portion defining a retaining notch including a pair of generally parallel mating flanges; and
    a metal retainer having a second body portion defining an engagement aperture having angled insertion walls and a pair of generally planar engagement surfaces, the engagement aperture configured to mate with the retaining notch, the metal retainer further having four pair of retention flanges, each of said retention flanges defining an angled insertion portion, and at least one of said retention flanges having a retaining finger configured to engage the flange of the component, wherein the metal retainer further comprises a C-shaped raised flange around the engagement aperture configured to mate with the retaining notch.

8. The fastening system according to claim 7 wherein the retaining notch further includes a cylindrical body configured to releasably engage the retaining aperture.

9. The fastening system according to claim 7 wherein the retention flanges define a plurality of deformable flanges, at least one of the deformable flanges defines a tooth configured to mate with the flanged component.

10. The fastening system according to claim 9 wherein the deformable flanges are coupled to a base portion of the metal fastener.

11. The fastening system according to claim 9 wherein the deformable flanges comprise insertion flanges.

12. A fastener for coupling a flanged trim component to a sheet metal structure comprising:

a retaining member coupled to the sheet metal structure by at least two deformable members defined on the retaining member, the deformable members defining a tooth configured to engage an aperture defined in the sheet metal structure, the retaining member defining a channel; and a generally flat body portion, the body portion defining a coupling region and having a C-shaped raised portion configured to engage the retaining member, wherein the body portion further defines an insertion channel configured to assist the insertion of the channel into the coupling region, said insertion channel having a pair of generally planar engagement surfaces; and four locking members, each of said four locking members having a pair of generally parallel retaining flanges, the retaining flanges defining an angled insertion portion and at least one retention tooth.

13. The fastener according to claim 12 wherein the retaining flanges are configured to be coupled to at least one flange formed on the trim component.

* * * * *